United States Patent
Wang et al.

(10) Patent No.: US 11,813,749 B2
(45) Date of Patent: *Nov. 14, 2023

(54) ROBOT TEACHING BY HUMAN DEMONSTRATION

(71) Applicant: FANUC CORPORATION, Yamanashi (JP)

(72) Inventors: Kaimeng Wang, Fremont, CA (US); Tetsuaki Kato, Fremont, CA (US)

(73) Assignee: FANUC CORPORATION, Yamanashi (JP)

(*) Notice: Subject to any disclaimer, the term of this patent is extended or adjusted under 35 U.S.C. 154(b) by 124 days.

This patent is subject to a terminal disclaimer.

(21) Appl. No.: 16/843,185

(22) Filed: Apr. 8, 2020

(65) Prior Publication Data
US 2021/0316449 A1     Oct. 14, 2021

(51) Int. Cl.
*B25J 9/16*     (2006.01)

(52) U.S. Cl.
CPC ............ *B25J 9/163* (2013.01); *B25J 9/1664* (2013.01); *B25J 9/1612* (2013.01); *G05B 2219/39546* (2013.01); *G05B 2219/40116* (2013.01)

(58) Field of Classification Search
CPC ........ B25J 9/163; B25J 9/1664; B25J 9/1612; B25J 9/1697; B25J 9/1656;
(Continued)

(56) References Cited

U.S. PATENT DOCUMENTS

| 5,040,056 A | * | 8/1991 | Sager | B25J 19/023 348/88 |
| 6,435,794 B1 | | 8/2002 | Springer | |

(Continued)

FOREIGN PATENT DOCUMENTS

| CN | 107169519 A | | 9/2017 |
| JP | 2015044257 A | * | 3/2015 |

OTHER PUBLICATIONS

Yunde, Jiar, et al., Hand Action Perception for Robot Programming, 1996, Carnegie Mellon University, 1586-1593 (Year: 1996).*

(Continued)

*Primary Examiner* — Abby Y Lin
*Assistant Examiner* — Karston G. Evans
(74) *Attorney, Agent, or Firm* — Shumaker, Loop & Kendrick, LLP; John A. Miller

(57) ABSTRACT

A method for teaching a robot to perform an operation based on human demonstration with images from a camera. The method includes a teaching phase where a 2D or 3D camera detects a human hand grasping and moving a workpiece, and images of the hand and workpiece are analyzed to determine a robot gripper pose and positions which equate to the pose and positions of the hand and corresponding pose and positions of the workpiece. Robot programming commands are then generated from the computed gripper pose and position relative to the workpiece pose and position. In a replay phase, the camera identifies workpiece pose and position, and the programming commands cause the robot to move the gripper to pick, move and place the workpiece as demonstrated. A teleoperation mode is also disclosed, where camera images of a human hand are used to control movement of the robot in real time.

20 Claims, 12 Drawing Sheets

(58) Field of Classification Search
CPC ........... G05B 2219/39546; G05B 2219/40116;
G05B 2219/40532; G05B 2219/3481;
G05B 2219/3482; G05B 2219/3483;
G05B 2219/3484
See application file for complete search history.

(56) References Cited

U.S. PATENT DOCUMENTS

| | | | |
|---|---|---|---|
| 7,626,571 | B2 | 12/2009 | Conti et al. |
| 8,989,902 | B1* | 3/2015 | Crawford ............... B25J 13/082 |
| | | | 700/257 |
| 9,122,275 | B2 | 9/2015 | Kim et al. |
| 9,321,176 | B1* | 4/2016 | Sun ........................ B25J 9/1656 |
| 9,785,247 | B1 | 10/2017 | Horowitz et al. |
| 9,849,595 | B2 | 12/2017 | Wang et al. |
| 9,901,402 | B2* | 2/2018 | Itkowitz ................. B25J 13/084 |
| 10,272,566 | B2 | 4/2019 | Wellman et al. |
| 10,929,654 | B2* | 2/2021 | Iqbal ................. G06K 9/00375 |
| 11,130,236 | B2* | 9/2021 | Chen ....................... B25J 9/1633 |
| 2009/0132088 | A1 | 5/2009 | Taitler |
| 2015/0100910 | A1* | 4/2015 | Luo ..................... G06F 3/04886 |
| | | | 715/771 |
| 2015/0314442 | A1* | 11/2015 | Boca ....................... B25J 9/1656 |
| | | | 700/253 |
| 2016/0307032 | A1* | 10/2016 | Butler ................... G06V 40/107 |
| 2017/0322629 | A1 | 11/2017 | Pirasmepulkul et al. |
| 2018/0154518 | A1 | 6/2018 | Rossano et al. |
| 2019/0210217 | A1* | 7/2019 | Jetté ..................... B23Q 1/5462 |
| 2020/0226786 | A1* | 7/2020 | Fitzgibbon ........... G06K 9/3216 |
| 2020/0401232 | A1* | 12/2020 | Sills .......................... B25J 13/08 |
| 2021/0086364 | A1* | 3/2021 | Handa ....................... B25J 9/161 |
| 2021/0142568 | A1* | 5/2021 | Kim ......................... G06F 3/011 |

OTHER PUBLICATIONS

Pham, Ngoc Hung, et al., A proposal of extracting of motion primitives by analyzing tracked data of hand motion from human demonstration, Jun. 22, 2016, 467-472 (Year: 2016).*
Wöhlke, J., et al., "Model-based Hand Pose Estimation for Generalized Hand Shape with Appearance Normalization," 2018, arXiv (Year: 2018).*
Bai, Y., Qi, Y., "A Robust Method For Hands Gesture Recognition From Egocentric Depth Sensor," 2018, IEEE, 2018 International Conference on Virtual Reality and Visualization (ICVRV), pp. 40-45 (Year: 2018).*
Teleoperation of a Robot Manipulator Using a Vision-Based Human-Robot Interface; Jonathan Kofman, Xianghai Wu, Timothy J. Luu, and Siddharth Verma; IEEE Transactions of Industrial Electronics, vol. 52, No. 5, Oct. 2005; 14 pages.
Learning to Estimate 3D Hand Pose from Single RGB Images; Christian Zimmermann, Thomas Brox; University of Freiburg; 12 pages; https://arxiv.org/abs/1705.01389; 2017.
GANerated Hands for Real-time 3D Hand Tracking from Monocular RGB; Franziska Mueller, Florian Bernard, Oleksandr Sotnychenko, Dushyant Mehta, Srinath Sridhar, Dan Casas, Christian Theobalt; https://arxiv.org/abs/1712.01057; 13 Pages; 2018.

* cited by examiner

ROBOT TEACHING BY HUMAN DEMONSTRATION

BACKGROUND

Field

The present disclosure relates to the field of industrial robot programming and, more particularly, to a method for programming a robot to perform a workpiece pick, move and place operation, including a teaching phase where a single camera detects a human hand grasping and moving the workpiece, determines a gripper pose which equates to the pose of the hand, and generates robot programming commands from the computed gripper pose.

Discussion of the Related Art

The use of industrial robots to repeatedly perform a wide range of manufacturing, assembly and material movement operations is well known. However, teaching a robot to perform even a fairly simple operation—such as picking up a workpiece in a random position and orientation on a conveyor and moving the workpiece to a container or a second conveyor—has been unintuitive, time-consuming and/or costly using conventional methods.

Robots have traditionally been taught to perform pick and place operations of the type described above by a human operator using a teach pendant. The teach pendant is used by the operator to instruct the robot to make incremental moves—such as "jog in the X-direction" or "rotate gripper about local Z-axis"—until the robot and it's gripper are in the correct position and orientation to grasp the workpiece. Then the robot configuration and the workpiece position and pose are recorded by the robot controller to be used for the "pick" operation. Similar teach pendant commands are then used to define the "move" and "place" operations. However, the use of a teach pendant for programming a robot is often found to be unintuitive, error-prone and time-consuming, especially to non-expert operators.

Another known technique of teaching a robot to perform a pick and place operation is the use of a motion capture system. A motion capture system consists of multiple cameras arrayed around a work cell to record positions and orientations of a human operator and a workpiece as the operator manipulates the workpiece. The operator and/or the workpiece may have uniquely recognizable marker dots affixed in order to more precisely detect key locations on the operator and the workpiece in the camera images as the operation is performed. However, motion capture systems of this type are costly, and are difficult and time-consuming to set up and configure precisely so that the recorded positions are accurate.

In light of the circumstances described above, there is a need for an improved robot teaching technique which is simple and intuitive for a human operator to perform.

SUMMARY

In accordance with the teachings of the present disclosure, a method for teaching and controlling a robot to perform an operation based on human demonstration with images from a single camera is described and illustrated. The method includes a teaching phase where a single camera detects a human hand grasping and moving a workpiece, and images of the hand and the workpiece are analyzed to determine a robot gripper pose and positions which equate to the pose and positions of the hand and corresponding pose and positions of the workpiece. Techniques for using either a 2D camera or a 3D camera are disclosed. Robot programming commands are then generated from the computed gripper pose and position relative to the workpiece pose and position. In a replay phase, the camera identifies workpiece pose and position, and the programming commands cause the robot to move the gripper to pick, move and place the workpiece as demonstrated by the human hand. A teleoperation mode is also disclosed, where camera images of a human hand are used to control movement of the robot in real time.

Additional features of the presently disclosed devices and methods will become apparent from the following description and appended claims, taken in conjunction with the accompanying drawings.

DETAILED DESCRIPTION OF THE EMBODIMENTS

Figure 1:
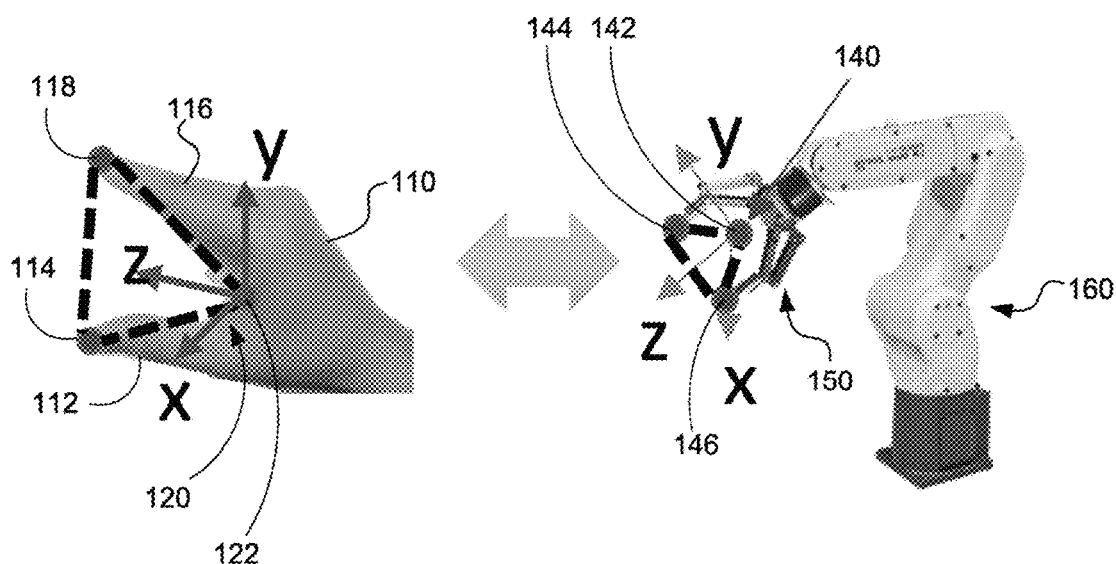
FIG. 1 is an illustration of how images of a human hand are analyzed to determine a corresponding position and orientation of a finger-type robotic gripper, according to an embodiment of the present disclosure.

The following discussion of the embodiments of the disclosure directed to teaching a robot by human demonstration using a single camera is merely exemplary in nature, and is in no way intended to limit the disclosed devices and techniques or their applications or uses.

It is well known to use industrial robots for a variety of manufacturing, assembly and material movement operations. One known type of robotic operation is sometimes known as "pick, move and place", where a robot picks up a part or workpiece from a first location, moves the part and places it at a second location. The first location is often a conveyor belt where randomly oriented parts are streaming, such as parts which were just taken from a mold. The second location may be another conveyor leading to a different operation, or may be a shipping container, but in either case, the part needs to be placed at a particular location and oriented in a particular pose at the second location.

In order to perform pick, move and place operations of the type described above, a camera is typically used to determine the position and orientation of incoming parts, and a robot must be taught to grasp the part in a specific manner using a finger-type gripper or a magnetic or suction cup gripper. Teaching the robot how to grasp the part according to the part's orientation has traditionally been done by a human operator using a teach pendant. The teach pendant is used by the operator to instruct the robot to make incremental moves—such as "jog in the X-direction" or "rotate gripper about local Z-axis"—until the robot and it's gripper are in the correct position and orientation to grasp the workpiece. Then the robot configuration and the workpiece position and pose are recorded by the robot controller to be used for the "pick" operation. Similar teach pendant commands are then used to define the "move" and "place" operations. However, the use of a teach pendant for programming a robot is often found to be unintuitive, error-prone and time-consuming, especially to non-expert operators.

Another known technique of teaching a robot to perform a pick, move and place operation is the use of a motion capture system. A motion capture system consists of multiple cameras arrayed around a work cell to record positions and orientations of a human operator and a workpiece as the operator manipulates the workpiece. The operator and/or the workpiece may have uniquely recognizable marker dots affixed in order to more precisely detect key locations on the operator and the workpiece in the camera images as the operation is performed. However, motion capture systems of this type are costly, and are difficult and time-consuming to set up and configure precisely so that the recorded positions are accurate.

The present disclosure overcomes the limitations of existing robot teaching methods by providing a technique which uses a single camera to capture images of a human performing natural part grasping and movement actions, where images of the person's hand and its position relative to the part are analyzed to generate robotic programming commands.

FIG. 1 is an illustration of how images of a human hand are analyzed to determine a corresponding position and orientation of a finger-type robotic gripper, according to an embodiment of the present disclosure. A hand 110 has a hand coordinate frame 120 defined as being attached thereto. The hand 110 includes a thumb 112 with a thumb tip 114, and a forefinger 116 with a forefinger tip 118. Other points on the thumb 112 and the forefinger 116 may also be identified in the camera images, such as the locations of the base of the thumb 112 and the forefinger 116 and the first knuckle of the thumb 112 and the forefinger 116, etc.

A point 122 is located midway between the base of the thumb 112 and the base of the forefinger 116, where the point 122 is defined as the origin of the hand coordinate frame 120. The orientation of the hand coordinate frame 120 may be defined using any convention which is suitable for correlation to the robotic gripper orientation. For example, the Y axis of the hand coordinate frame 120 may be defined as being normal to the plane of the thumb 112 and the forefinger 116 (that plane being defined by the points 114, 118 and 122). Accordingly, the X and Z axes lie in the plane of the thumb 112 and the forefinger 116. Further, the Z axis may be defined as bisecting the angle made by the thumb 112 and the forefinger 116 (the angle 114-122-118). The X axis orientation may then be found by the right hand rule from the known Y and Z axes. As mentioned above, the conventions defined here are merely exemplary, and other coordinate frame orientations may be used instead. The point is that a coordinate frame position and orientation may be defined based on key recognizable points on the hand, and that coordinate frame position and orientation can be correlated to a robotic gripper position and orientation.

A camera (not shown in FIG. 1; discussed later) may be used to provide images of the hand 110, where the images can then be analyzed to determine the spatial positions (such as in a work cell coordinate frame) of the thumb 112 and the forefinger 116, including the thumb tip 114 and the forefinger tip 118 along with the knuckles, and therefore the origin location 122 and orientation of the hand reference frame 120. In FIG. 1, the location and orientation of the hand reference frame 120 are correlated to a gripper coordinate frame 140 of a gripper 150 attached to a robot 160. The gripper coordinate frame 140 has an origin 142 which corresponds to the origin 122 of the hand reference frame 120, and points 144 and 146 which correspond to the forefinger tip 118 and the thumb tip 114, respectively. Thus, the two fingers of the finger-type gripper 150 are in the X-Z plane of the gripper coordinate frame 140, with the Z axis bisecting the angle 146-142-144.

The origin 142 of the gripper coordinate frame 140 is also defined as the tool center point of the robot 160. The tool center point is a point whose location and orientation are known to the robot controller, where the controller can provide command signals to the robot 160 to move the tool center point and its associated coordinate frame (the gripper coordinate frame 140) to a defined location and orientation.

Figure 2:
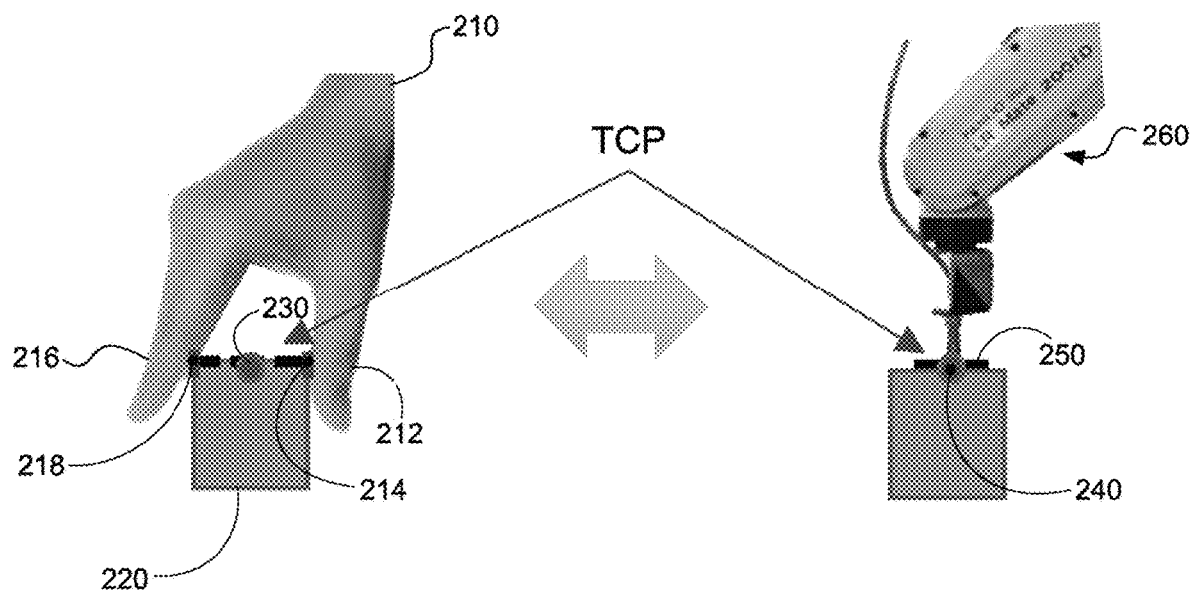
FIG. 2 is an illustration of how images of a human hand are analyzed to determine a corresponding position and orientation of a magnetic or suction cup type robotic gripper, according to an embodiment of the present disclosure.

FIG. 2 is an illustration of how images of a human hand are analyzed to determine a corresponding position and orientation of a magnetic or suction cup type robotic gripper, according to an embodiment of the present disclosure. Whereas FIG. 1 showed how a hand pose can be correlated to an orientation of a mechanical gripper with movable fingers, FIG. 2 shows how the hand pose can be correlated to a flat gripper (circular, for example) which picks up a part by a flat surface of the part with either suction force or magnetic force.

A hand 210 again includes a thumb 212 and a forefinger 216. A point 214 is located where the thumb 212 makes contact with a part 220. A point 218 is located where the forefinger 216 makes contact with the part 220. A point 230 is defined as existing midway between the points 214 and 218, where the point 230 corresponds to a tool center point (TCP) 240 of a surface gripper 250 on a robot 260. In the case of the surface gripper 250 shown in FIG. 2, the plane of the gripper 250 may be defined as the plane containing the line 214-218 and perpendicular to the plane of the thumb 212 and the forefinger 216 based on detection of knuckle joints and fingertips. The tool center point 240 of the gripper 250 corresponds to the point 230, as stated above. This fully defines a location and orientation of the surface gripper 250 corresponding to the position and pose of the hand 210.

Figure 3:
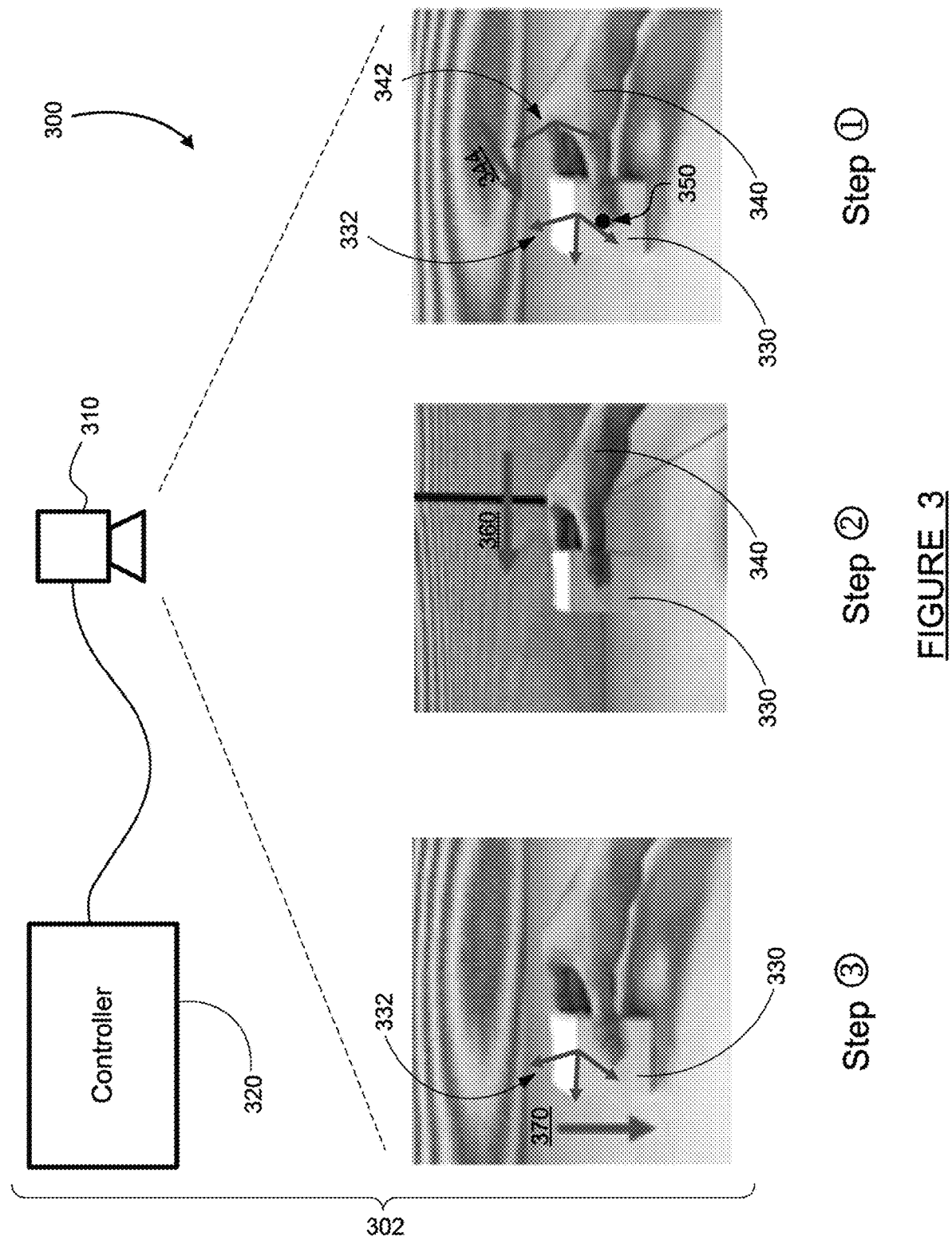
FIG. 3 is an illustration of a system and steps for teaching a robot to perform a pick and place operation using camera images of a human hand, according to an embodiment of the present disclosure.

FIG. 3 is an illustration of a system 300 and steps for teaching a robot to perform a pick and place operation using camera images of a human hand, according to an embodiment of the present disclosure. The teaching phase illustrated in FIG. 3 is performed in a work cell 302. The work cell 302 includes a camera 310 for taking images of the teaching steps. The camera 310 may be a three-dimensional (3D) camera or two-dimensional (2D) camera—as long as it is capable of identifying coordinates of specific points and features of the hand, such as the fingertip, thumb tip and knuckle joints discussed earlier. Techniques for using a 3D camera for hand pose detection, and different techniques for using a 2D camera for hand pose detection, are discussed below. The camera 310 is configured to provide images of the portion of the work cell 302 where the part movement activity is taking place (all of the Steps ①-③ discussed below).

The camera 310 communicates with a robot controller 320. The controller 320 analyzes images of the teaching steps and generates robot programming commands as discussed below, where the robot programming commands are used to control motion of a robot performing the pick and place operation during a replay phase. A separate computer could also be provided the between the camera 310 and the controller 320, where this separate computer would analyze camera images and communicate a gripper position to the controller 320. The teaching phase of FIG. 3 consists of three steps: in a Pick step (Step ①), a position and pose (pose is interchangeable terminology for orientation) of a workpiece are determined, and a position and pose of a hand grasping the workpiece are determined; in a Move step (Step ②), a the position of the workpiece and the hand are tracked as the workpiece is moved from the Pick location to a Place location; in a Place step (Step ③), a position and pose of the workpiece are determined when the workpiece is placed in its destination (Place) location. The three steps are discussed in detail below.

In Step ① (Pick), camera images are used to identify a position and pose of a workpiece 330. If workpieces are streaming inbound on a conveyor, then one coordinate (such as Z) of the position of the workpiece 330 is tracked according to a conveyor position index. The workpiece 330 shown in FIG. 3 is a simple cube; however, any type or shape of the workpiece 330 may be identified from camera images. For example, if the workpiece 330 is known to be a particular injection molded part, and may have any random orientation and position on the conveyor, the images from the camera 310 can be analyzed to identify key features of the workpiece 330 and from those features determine a position and orientation of a workpiece coordinate frame 332.

Still at Step ① (Pick), camera images are also used to identify a position and pose of a hand 340 as it grasps the workpiece 330. The images of the hand 340 are analyzed to determine a position and orientation of a hand coordinate frame 342, in the manner discussed above with respect to FIG. 1 and described in detail (two different techniques) below. The hand 340 approaches the workpiece 330 in a direction shown by arrow 344. When the thumb tip contacts the workpiece 330 as shown at point 350 and the fingertip contacts the workpiece 330 (this contact point not visible), the controller 320 stores all of the data from this particular image as the Pick data. The Pick data includes a position and pose of the workpiece 330 as defined by its workpiece coordinate frame 332 and a position and pose of the hand 340 as defined by its hand coordinate frame 342.

In Step ② (Move), camera images are used to track the position of both the workpiece 330 and the hand 340 as they move along a path 360. Multiple images of the workpiece 330 and the hand 340 are recorded to define the path 360, which may not be a straight line. For example, the path 360 may comprise a long, sweeping curve, or the path 360 may involve moving the workpiece 330 up and over a barrier of some sort. In any case, the path 360 includes multiple points defining the position (and optionally orientation) of the workpiece 330 and the hand 340 during the Move step. The same techniques discussed previously are used to identify the position and pose of the workpiece coordinate frame 332 and the position and pose of the hand coordinate frame 342 from the camera images. The hand pose determination techniques are also discussed in detail below.

In Step ③ (Place), camera images are used to identify the final position and pose of the workpiece 330 (as defined by its workpiece coordinate frame 332) after it is placed in its destination location as shown by arrow 370. The same techniques discussed previously are used to identify the position and pose of the workpiece coordinate frame 332 from the camera images. When the thumb tip and the fingertip break contact with the workpiece 330, the controller 320 stores the workpiece coordinate frame data from this particular image as the Place data. The Place data may also be recorded and stored based on the workpiece 330 having stopped moving—that is, the workpiece coordinate frame 332 being in the exact same position and pose for a period of time (such as 1-2 seconds).

Figure 4:
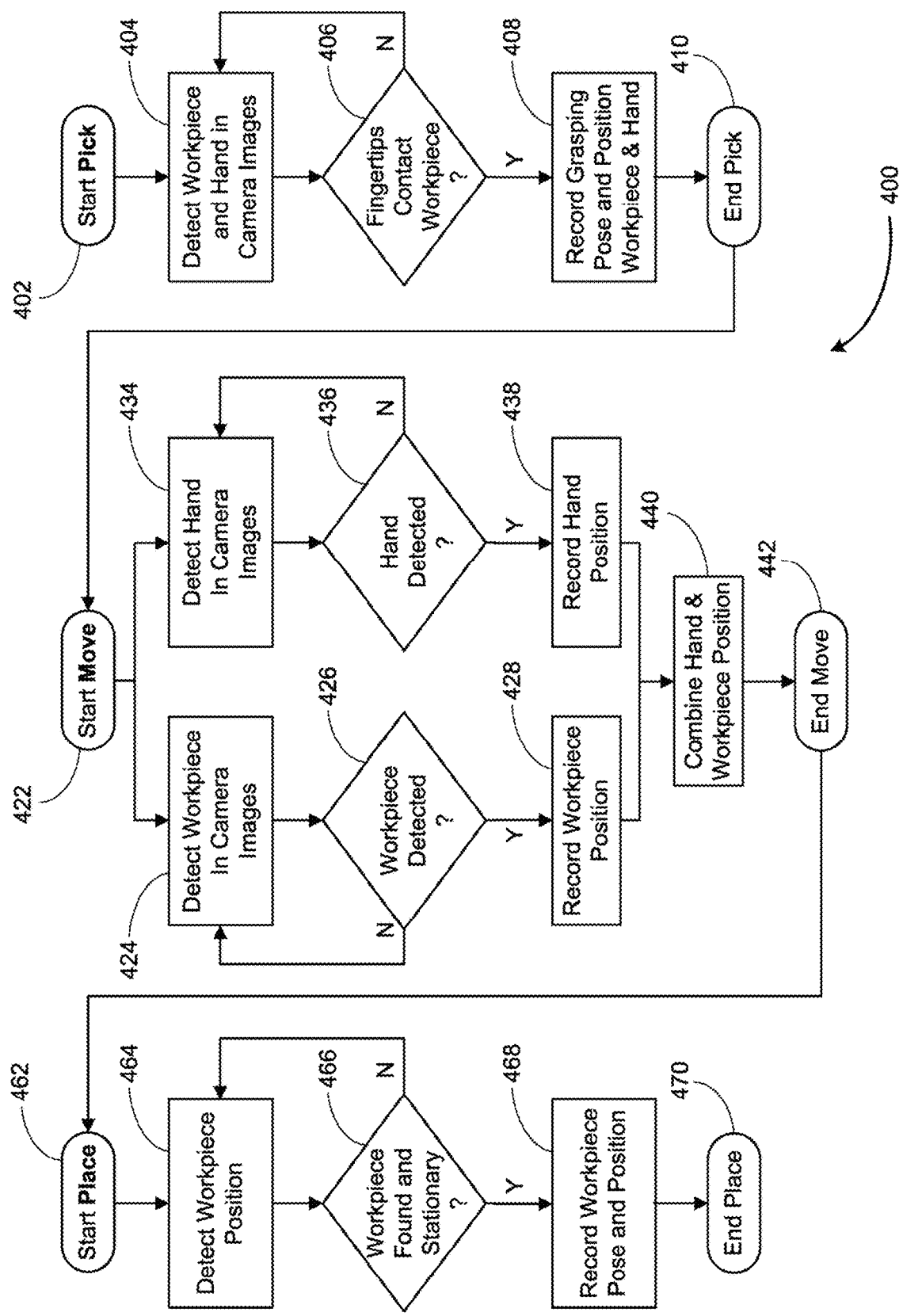
FIG. 4 is a flowchart diagram of a method for teaching a robot to perform a pick and place operation using camera images of a human hand and a workpiece, according to an embodiment of the present disclosure.

FIG. 4 is a flowchart diagram 400 of a method for teaching a robot to perform a pick and place operation using camera images of a human hand and a workpiece, according to an embodiment of the present disclosure. The flowchart diagram 400 is arranged in three vertical columns, corresponding with the Pick step (at the right), the Move step (center) and the Place step (at the left) as shown in FIG. 3. The Pick step begins at a start box 402. At box 404, the workpiece 330 and the hand 340 are detected in images from the camera 310. The analysis of images is performed in the controller 320 or a separate computer communicating with the controller 320. The position and orientation of the workpiece coordinate frame 332 are determined from analysis of images of the workpiece 330, and the position and orientation of the hand coordinate frame 342 are determined from analysis of images of the hand 340.

At decision diamond 406, it is determined if the fingertips (thumb tip 114 and forefinger tip 118 of FIG. 1) have contacted the workpiece 330. This is determined from camera images. When the fingertips have contacted the workpiece 330, the grasping pose and position of the workpiece 330 and the hand 340 are recorded by the controller 320 at box 408. It is important that the pose and position of the hand 340 relative to the workpiece 330 are identified; that is, the position and orientation of the hand coordinate frame 342 and the workpiece coordinate frame 332 must be defined relative to some global fixed reference frame such as a work cell coordinate frame. This allows the controller 320 to determine how to position the gripper to grasp a workpiece in a later replay phase, discussed below.

After the grasping pose and position of the workpiece 330 and the hand 340 are recorded by the controller 320 at the box 408, the Pick step ends at an end box 410. The process then moves on to the Move step, which begins at box 422. At box 424, the workpiece 330 is detected in camera images. At decision diamond 426, if the workpiece 330 is not detected in the camera images, the process loops back to the box 424 to take another image. When the workpiece 330 is detected in a camera image, the workpiece position (and optionally pose) is recorded by the controller 320 at box 428.

At box 434, the hand 340 is detected in camera images. At decision diamond 436, if the hand 340 is not detected in the camera images, the process loops back to the box 434 to take another image. When the hand 340 is detected in a camera image, the hand position (and optionally pose) is recorded by the controller 320 at box 438. When both the workpiece position (from the box 428) and the hand position (from the box 438) are detected and recorded from the same camera image, the hand position and the workpiece position are combined and recorded at box 440. Combining the hand position and the workpiece position may be accomplished by simply taking the mean of the two; for example, if the midpoint between the thumb tip 114 and the forefinger tip 118 should coincide with the center/origin of the workpiece 330, then a mean location can be computed between the midpoint and the workpiece center.

Multiple positions along the Move step are preferably recorded to define a smooth Move path, by repeating the activities from the Start Move box 422 through the Combine Hand & Workpiece Position box 440. After the hand position and the workpiece position are combined and recorded at the box 440, and no more Move step positions are needed, the Move step ends at an end box 442. The process then proceeds on to the Place step, which begins at box 462.

At box 464, the position of the workpiece 330 is detected in images from the camera 310. Like all of the image analysis steps, the analysis of images at the box 464 is performed in the controller 320, or on a graphics processor attached to the controller 320, or on an intermediate computer if so desired. At decision diamond 466, it is determined if the workpiece 330 is found in the camera images and if the workpiece 330 is stationary. Alternately, it could be determined whether the fingertips have broken contact with the workpiece 330. When the workpiece 330 is determined to be stationary, and/or the fingertips have broken contact with the workpiece 330, the destination pose and position of the workpiece 330 are recorded by the controller 320 at box 468. The Place step and the entire process of the teaching phase end at an end box 470.

Throughout the preceding discussion of FIGS. 1-4, many references have been made to the concept of detecting a hand pose (positions of key points on the thumb and forefinger) from camera images and defining a hand coordinate system therefrom. In order to define the origin and the axis orientations of a hand coordinate system (such as the hand coordinate frame 120 of FIG. 1), three dimensional (X, Y and Z) coordinates of the key points of the hand must be determined. Two different techniques for determining the 3D coordinates of the key points of the hand are described in the following discussion. Either of these hand pose detection techniques may be used in the overall method for robot teaching from human demonstration.

In one embodiment of hand pose detection, a three-dimensional (3D) camera is used to directly detect the 3D coordinates of the key points of the hand. A 3D camera (which could be the camera 310 of FIG. 3) is capable of not only providing an image where key points can be identified in the image plane, but also detecting depth (distance in a direction normal to the image plane) at the key points. Some 3D cameras use two or more lenses or a single lens that shifts its position to record multiple points of view, where the combination of the two perspectives makes depth perception possible. Other 3D cameras use range imaging to determine a range (distance) from the camera lens to various points in an image. Range imaging may be accomplished using time-of-flight measurements or other techniques.

Using the data directly available from a 3D camera, the X/Y/Z coordinates of key points on the hand (such as the points 112 and 118 of FIG. 1, etc.) may be determined. From the X/Y/Z coordinates of key points on the hand, the origin and orientation of the hand coordinate frame may be fully computed, as discussed earlier. Robot motion commands may then be defined based on the correspondence between the hand coordinate frame and the gripper coordinate frame, as discussed earlier.

In another embodiment of hand pose detection, a two-dimensional (2D) camera may be used to detect the 3D coordinates of the key points of the hand using a two-step process. Because 2D cameras are more widely available and less expensive than 3D cameras, and because 2D cameras have much faster image frame rates, the use of 2D cameras for robot teaching by human demonstration may be advantageous in some applications.

Existing techniques for determining the X/Y/Z coordinates of key points on the hand from a 2D image can be unreliable. These existing methods typically rely on deep learning image analysis techniques using a database containing both real and synthetic hand images. However, because hand size varies substantially from person to person, these existing methods can suffer from low accuracy.

In order to overcome the limitations of existing methods, a new technique for detecting hand pose from 2D camera images is disclosed here, where a one-time preliminary step of measuring hand size is performed, and then 2D camera images during robot teaching can be accurately analyzed for 3D coordinates of key points on the hand.

Figure 5A:
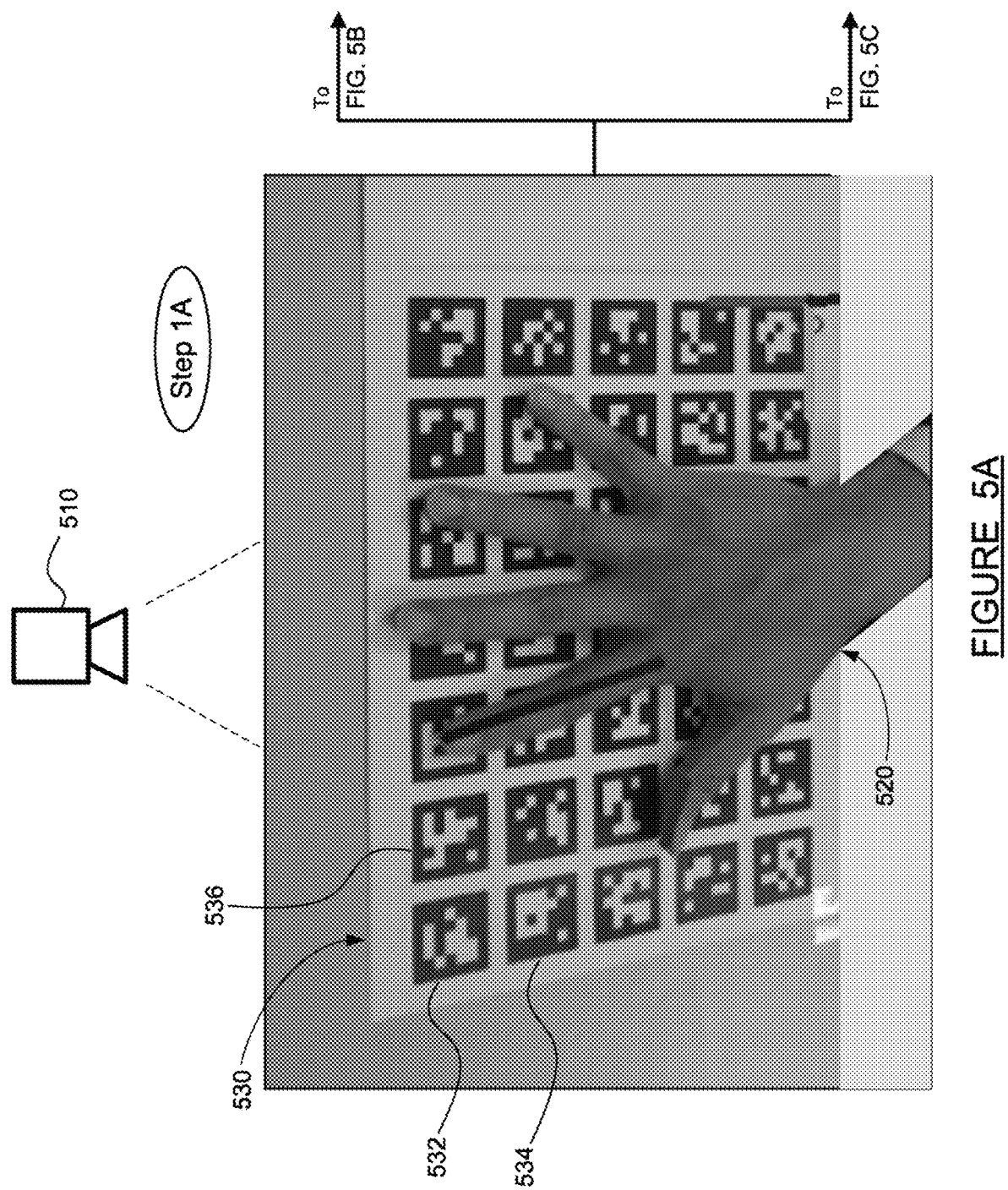
FIGS. 5A through 5D are illustrations of four parts of a first step for detecting hand pose from 2D camera images, determining hand size, according to an embodiment of the present disclosure.

FIG. 5A is an illustration of a first part of a first step for detecting hand pose from 2D camera images, according to an embodiment of the present disclosure. In this first part of the first step, which will be called Step 1A, a camera 510 is used to capture an image of a hand 520 of an operator who will later be teaching a robot program via human demonstration. The camera 520 may be the same as the camera 310 of FIG. 3. The hand 520 is placed on a grid 530 of ArUco markers and a picture (digital image) is taken in Step 1A. Traditional chessboards for camera calibration is another option that can be used to instead of ArUco markers. The digital image is analyzed in the remainder of Step 1 to determine the size of individual elements or segments of the hand 520. Step 1 is performed only once for an individual operator's hand. Step 2 (robot path and process teaching by human hand demonstration) can be performed many times for the hand 520 without ever having to repeat Step 1.

The Step 1 process is based on finding correspondences between points in the real/physical environment and their 2D image projection. In order to facilitate this step, synthetic or fiducial markers are employed. One approach is the use of binary square fiducial markers such as the ArUco marker. The main benefit of these markers is that a single marker provides enough correspondences (its four corners) to obtain the camera pose relative to the plane of the marker. The use of many markers in the grid 530 provides enough data to determine the true size of individual finger segments of the hand 520.

An ArUco marker is a square visual marker comprising a wide black border and an inner binary matrix which determines its identifier. The black border facilitates its fast detection in the image and the binary codification allows its identification and the application of error detection and correction techniques. The grid 530 of FIG. 5A includes a 5×7 array of ArUco markers, including the individual markers 532, 534 and 536. Each ArUco marker in the grid 530 is unique. The 5×7 array used in the grid 530 is sized to facilitate visual measurement of a human hand, and is merely exemplary. The grid 530 of ArUco markers is used in order to provide sufficient information "bandwidth" in the digital image to enable both calibration of the image plane to the marker plane, and to determine the coordinates in the marker plane of a plurality of key points on the hand 520—as discussed below.

The image from Step 1A, with the hand 520 placed flat upon the grid 530, is provided to both Step 1B (FIG. 5B) and Step 1C (FIG. 5C) where two different types of image analysis are performed.

Figure 5B:
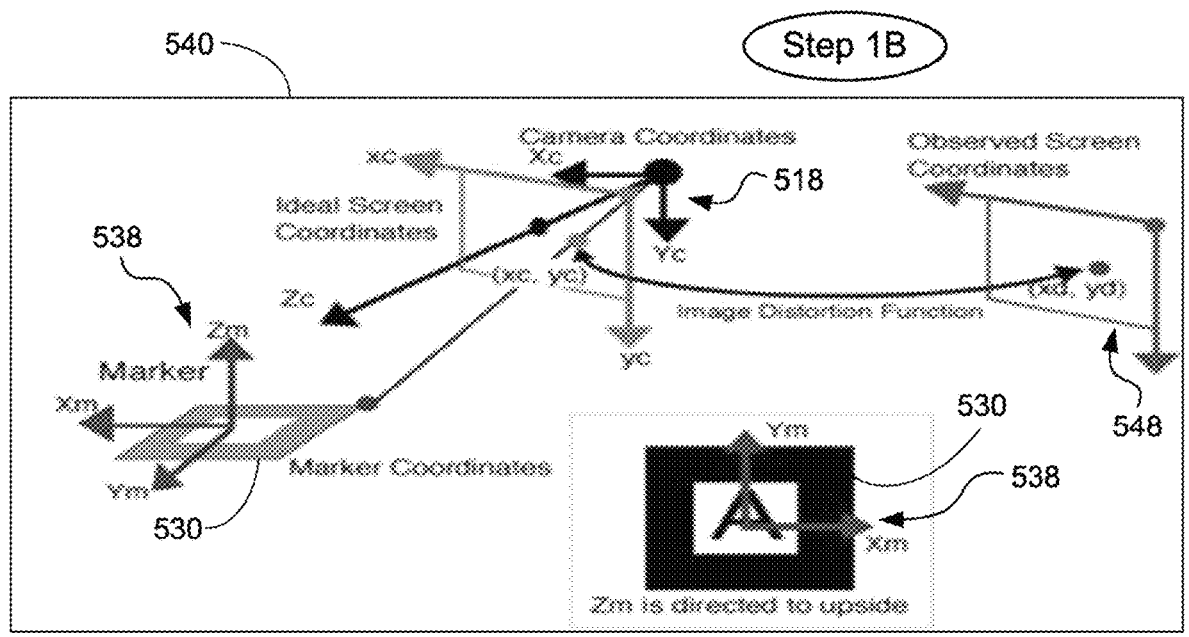

FIG. 5B is an illustration of a second part of the first step for detecting hand pose from 2D camera images, according to an embodiment of the present disclosure. In box 540, FIG. 5B depicts Step 1B of the hand size determination process. In Step 1B, analysis of the image from Step 1A is performed in order to determine rotational and translational transformations from the image (virtual) coordinates to marker (physical) coordinates. The grid 530, or any of the individual markers (532, 534, etc.) is defined has having a marker coordinate frame 538, with local X and Y axis in the plane of the marker and a local Z axis normal to the marker in the upward direction as shown.

The camera 510 (from FIG. 5A) has a camera coordinate frame 518 defined as being affixed thereto, with local X and Y axis in the plane of the screen or image, and local Z axis normal to the screen and oriented in the direction of the camera field of view (toward the marker grid 530). Note that in this technique, the camera does not have to be precisely aligned with the camera image plane parallel to the marker plane. The transformation calculations will take care of any rotational and translational misalignment. A point in the idealized image in the camera coordinate frame 518 has coordinates ($x_c$, $y_c$). The transformation from the marker coordinate frame 538 to the camera coordinate frame 518 is defined by a rotation vector R and a translation vector t.

An actual observed image coordinate frame 548 is defined as having local X and Y axis in the plane of the actual observed image, with the local Z axis being irrelevant as the image is two dimensional. The actual observed image coordinate frame 548 differs from the camera coordinate frame 518 due to image distortion. A point in the actual image in the actual observed image coordinate frame 548 has coordinates ($x_d$, $y_d$). The transformation from the camera coordinate frame 518 to the actual observed image coordinate frame 548 is defined by an intrinsic camera parameters matrix k. The camera intrinsic parameters include focal length, image sensor format, and principal point.

Figure 5C:
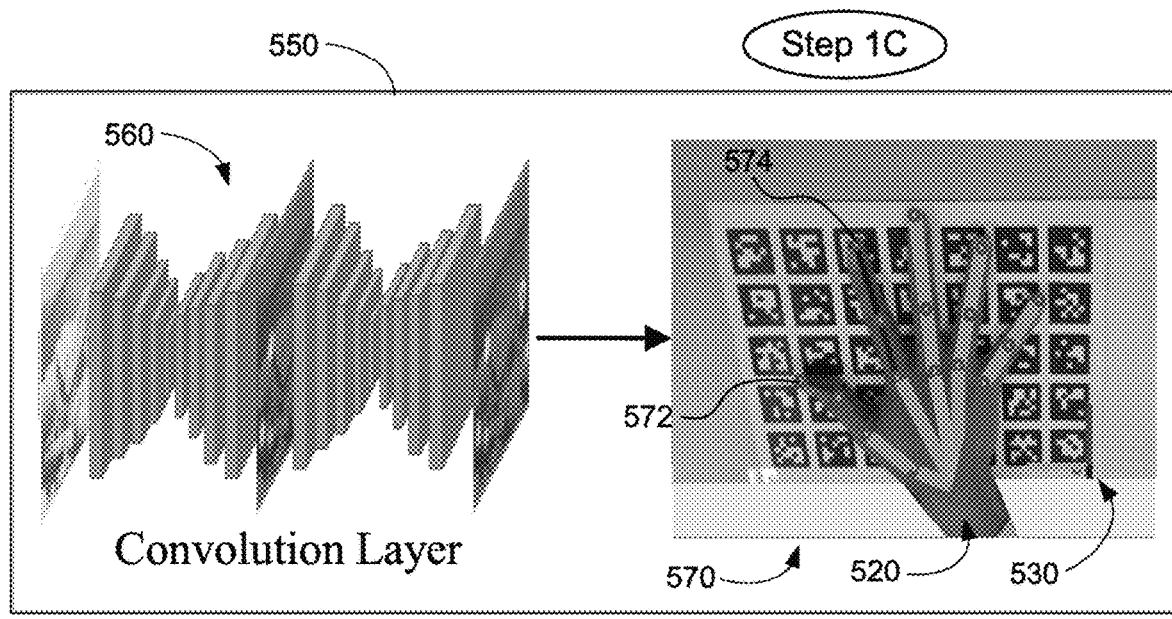

FIG. 5C is an illustration of a third part of the first step for detecting hand pose from 2D camera images, according to an embodiment of the present disclosure. In box 550, FIG. 5C depicts Step 1C of the hand size determination process. In Step 1C, analysis of the image from Step 1A is performed in order to locate key points of the hand 520 in the image.

A convolution layer 560 is used to analyze the image, and identify and locate the key points of the hand 520. A convolution layer is a class of deep neural networks commonly applied to analyzing visual imagery, as known in the art. The convolution layer 560 is specifically trained to identify the structural topology of a human hand—based on known hand anatomy and proportions, visual cues such as bends and bulges at knuckle joints, and other factors. In particular, the convolution layer 560 can identify and locate points in the image including fingertips and knuckle joints.

The output of the convolution layer 560 is shown at box 570. The hand 520 and the grid 530 of ArUco markers are visible in the image in the box 570. Also visible overlaid on the image is the topology of the hand 520—including the bones in the hand 520 and the joints between the bones represented as points. For example, the tip of the thumb is identified as point 572, and the tip of the index finger is identified as point 574. The points 572 and 574, and all of the key points shown in the topology in the box 570, have locations which are known in image coordinates—specifically, in the coordinates of the actual observed image coordinate frame 548. This is because the convolution layer 560 is applied to the image from Step 1A, which has not yet been adjusted or transformed in any way.

Figure 5D:
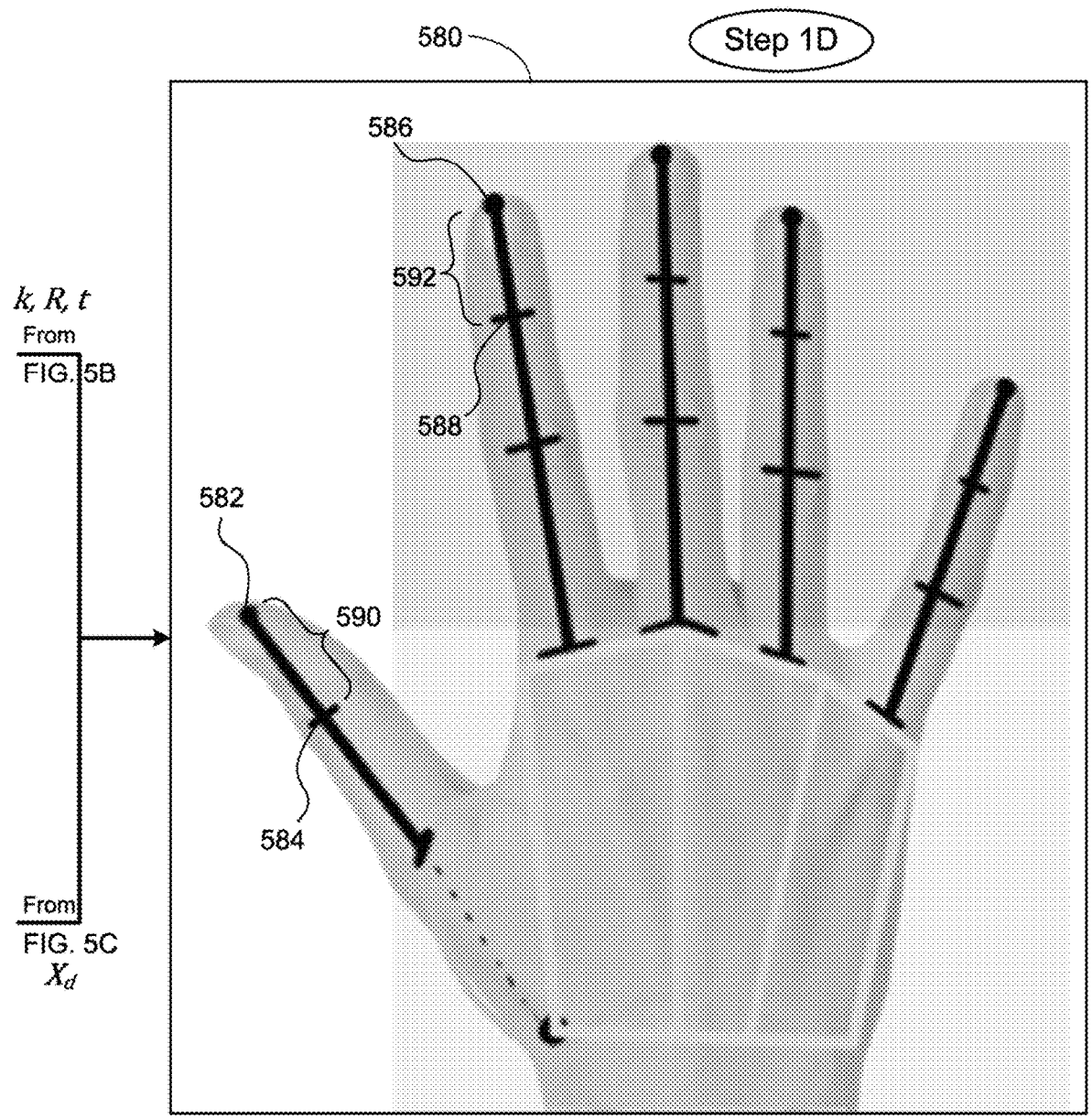

FIG. 5D is an illustration of a fourth part of the first step for detecting hand pose from 2D camera images, according to an embodiment of the present disclosure. The transformation parameters k, R and t from Step 1B (FIG. 5B) and the key points of the hand 520 in image coordinates from Step 1C (FIG. 5C) are both provided to Step 1D where a calculation is performed to determine the true distances between the key points of the hand 520.

The calculation performed to produce the topology of the hand 520 in true world/marker coordinates is defined as:

$$X_d = k[Rt]X_w \qquad (1)$$

Where $X_d$ is the set of hand key points in actual image coordinates from Step 1B, $X_w$ is the set of hand key points in world/marker coordinates which is currently being calculated, and k, R and t were defined above. Using Equation (1), the set of hand key points $X_w$ can be calculated. The hand key points $X_w$ shown in box 580 at Step 1D are in world coordinates and have been calibrated by the numerous ArUco markers in the same coordinate frame. Thus, a true distance between a point 582 (tip of thumb) and a point 584 (knuckle nearest the thumb tip) can be computed as the square root of the sum of the squares of the difference in coordinates of the points 582 and 584. This distance is shown at 590, and is the true length of the outer segment (bone) of the thumb. Likewise, a distance between a point 586 and a point 588 can be computed as shown at 592, and is the true length of the outer segment of the index finger. The true length of each bone (each segment of each digit) in the hand 520 can be computed in this way.

Step 1 of the method for detecting hand pose from 2D camera images, discussed above, provides the true length of each segment of each digit in the hand 520. The hand 520 can thenceforth be used for robot teaching, with images from the 2D camera being analyzed to determine 3D locations of key points, according to Step 2 of the method discussed below.

Figure 6A:
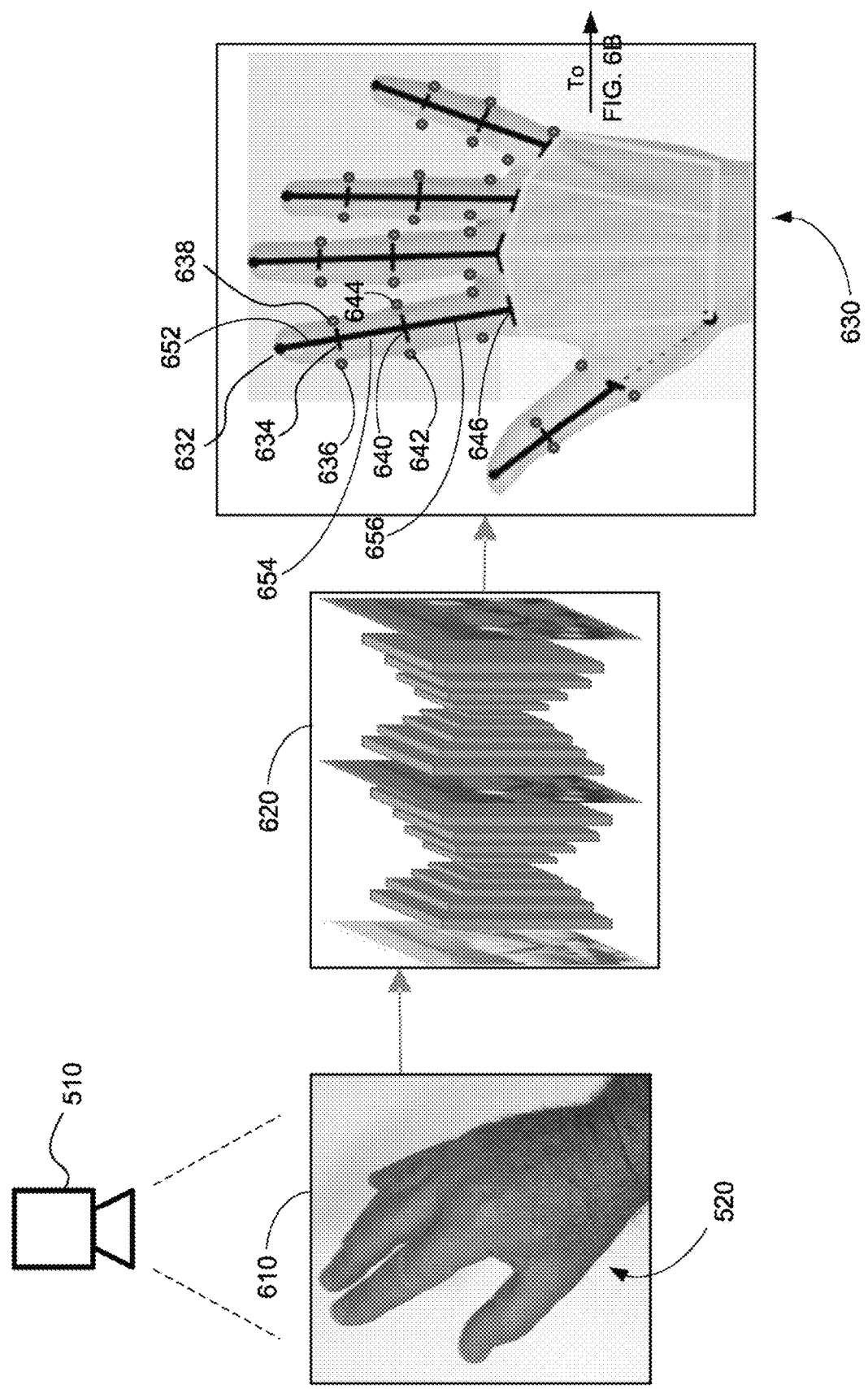
FIGS. 6A and 6B are illustrations of parts of a second step for detecting hand pose from 2D camera images, using hand size data determined in the first step, according to an embodiment of the present disclosure.

FIG. 6A is an illustration of a first part of a second step for detecting hand pose from 2D camera images, according to an embodiment of the present disclosure. In this first part of the second step, a camera image of the hand 520 in any arbitrary pose, such as gripping an object during a robot teaching session, is analyzed to identify the key points discussed above. In box 610, an image of the hand 520 is provided. The image can be provided by the camera 510 or a different camera. At box 620, image analysis is performed using a neural network convolution layer to identify key points on the hand 520, in the manner discussed above. The hand is typically not going to be laid flat on a surface in the image from the box 610, so some parts of the hand may be occluded (not visible in the image). Furthermore, the segments of the digits in the image from the box 610 will generally not be in a true-length position; this will be accounted for later.

At box 630, all recognizable key points on the hand 520 are identified with their location in screen coordinates. For example, a key point 632 at the tip of the index finger may be identified by finding a center tip of a digit which is proximal to the thumb. A key point 634 at the outer knuckle joint of the index finger may be identified as being between knuckle joint side points 636 and 638 which are identifiable in the image. The neural network convolution layer identifies the points based on its past training—such as by looking for bulges and bends in the image of the fingers. Other recognizable key points are similarly identified—such as a key point 640 at the middle knuckle joint of the index finger being between side points 642 and 644.

The screen coordinates of each of the finger segments (individual bones) in the hand 520 can then be determined. An index finger outer segment 652 is determined as a straight line running from the key point 632 to the key point 634, in the screen coordinates of the image from the box 610. Likewise, an index finger middle segment 654 is determined as a straight line running from the key point 634 to the key point 640, and an index finger inner segment 656 is determined as a straight line running from the key point 640 to the key point 646.

The diagram in the box 630 depicts the hand 520 in a flat position simply to clearly illustrate all of the different key points that may be identified if they are visible in the image from the box 610. In reality, the box 630 includes identity and location of the key points of the hand 520 in an image which looks just like the image at the box 610 (in a grasping pose, for example). The hand 520 is not flattened or transformed in any way from the camera image at the box 610 to the key point identification at the box 630.

Figure 6B:
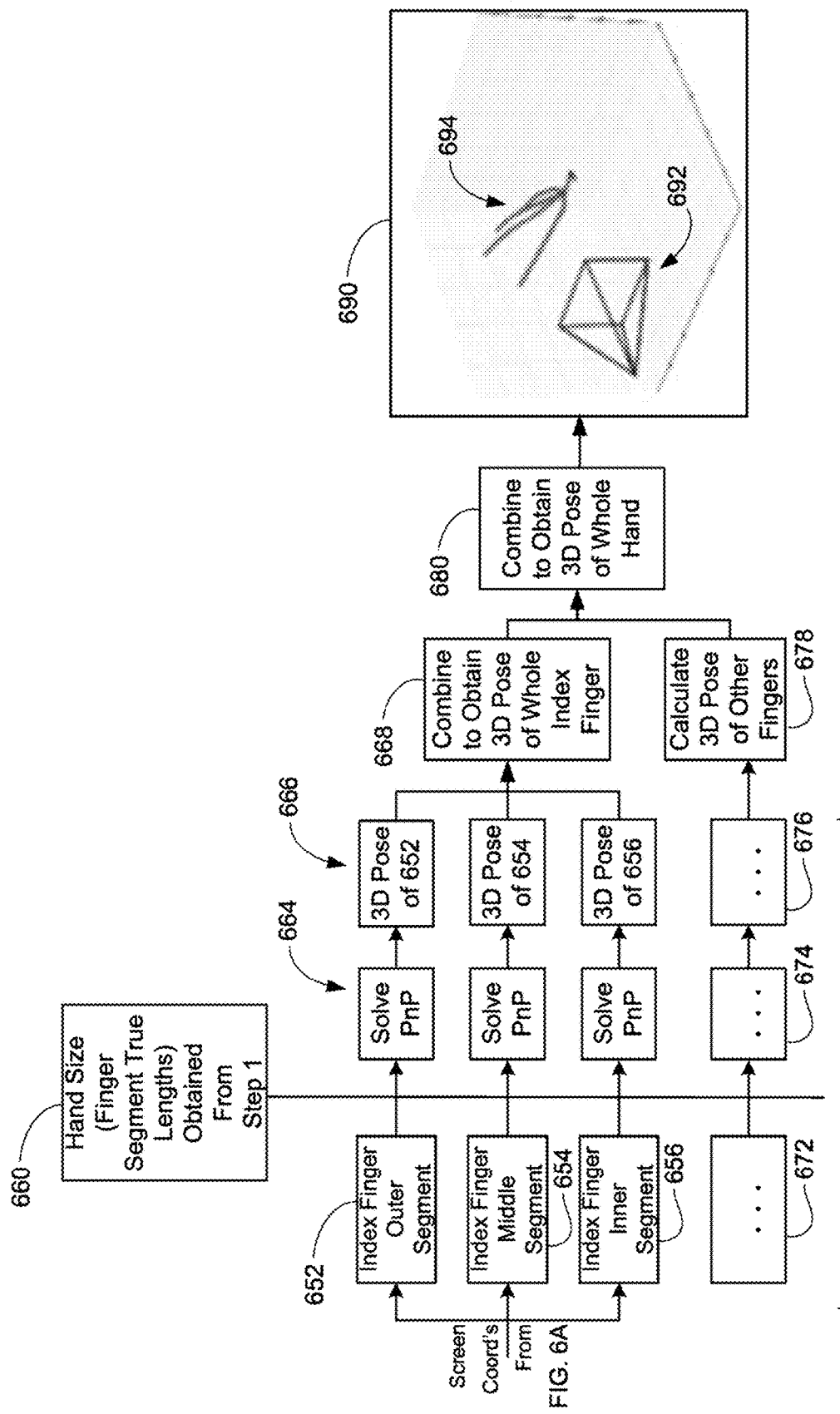

The screen coordinate locations and identity of all visible and recognizable key points and digit segments (finger bones) of the hand 520 are provided to additional analysis steps in FIG. 6B, where the 3D pose of the hand 520 will ultimately be determined.

FIG. 6B is an illustration of a second part of the second step for detecting hand pose from 2D camera images, according to an embodiment of the present disclosure. At box 660, the hand size from Step 1 (FIG. 5D) is provided as input. Specifically, the true length of each bone (each segment of each digit) in the hand 520 is provided, as discussed in detail above. Also, the identity and location in screen coordinates of each recognizable key point in the hand 520 in a pose, from the box 630 of FIG. 6A, is provided as input at the left. Using these inputs, a set of Perspective-n-Point calculations are performed as indicated at 662.

Perspective-n-Point (PnP) is the problem of estimating the pose of a calibrated camera given a set of n 3D points in the world and their corresponding 2D projections in an image. The camera pose consists of 6 degrees-of-freedom (DOF) which are made up of the rotation (roll, pitch, and yaw) and 3D translation of the camera with respect to a "world" or work cell coordinate frame. A commonly used solution to the problem exists for n=3 called P3P, and many solutions are available for the general case of n≥3. Because at least 4-6 key points on each segment of the index finger and the thumb will be identified in the box 630 of FIG. 6A (likely along with several other bones on other fingers), a more than sufficient number of points exist for the PnP calculations at 662.

The identity and location in screen coordinates of the key points on the index finger outer segment 652 are provided from the box 630 of FIG. 6A as shown. Likewise, the identity and location in screen coordinates of the key points on the index finger middle segment 654 and the index finger inner segment 656 are also provided. The true lengths of each of the finger segments (652, 654, 656) are provided from the box 660. For each of the fingers segments (652, 654, 656), the PnP problem is then solved in the boxes indicated at 664. Solving the PnP problem yields the pose of the camera 510 relative to each of the finger segments of the hand 520. Because the pose of the camera 510 in world or work cell coordinates is known, the pose of the finger segments of the hand 520 in world or work cell coordinates can therefore be calculated. In this manner, the 3D pose of the fingers segments (652, 654, 656) are obtained in the boxes indicated at 666. At box 668, the 3D pose of the individual segments 652, 654 and 656 are combined to obtain the 3D pose of the entire index finger.

At box 672, the identity and location in screen coordinates of the key points on the segments of the thumb and any other visible finger segments are provided from the box 630 of FIG. 6A. At box 674, the PnP problem is solved for each individual digit segment, using the key point screen coordinates and the true length of the digit segment as inputs as discussed above. At box 676, the 3D pose of each digit segment visible in the image from the box 610 is obtained. The segments of the thumb are combined at box 678 to obtain the 3D pose of the entire thumb, and likewise other visible fingers.

At box 680, the 3D pose of the fingers and thumb from the boxes 668 and 678 are combined to obtain the 3D pose of the whole hand 520. At box 690, the final outputs of the Step 2 method and calculations are shown—including a position and orientation of the camera 510 represented as pyramid shape 692, and a pose of the hand 520 represented as wireframe 694. The pose of the hand 520 includes the 3D location in world coordinates (or a work cell coordinate frame) of each identifiable digit segment (bone) on the hand 520, which as long as the thumb and index finger are located is sufficient to define the hand coordinate system 120 as shown in FIG. 1.

The second step of the method for detecting hand pose from 2D camera images, discussed above with respect to FIGS. 6A and 6B, is performed repeatedly and continuously during the overall process of robot teaching by human demonstration. That is, referring again to FIGS. 3 and 4, when a 2D camera is used to detect the hand 520 grasping and moving a workpiece, the hand pose at every position along the way is determined using the Step 2 sequence of FIGS. 6A and 6B. In contrast, Step 1 to determine hand size (true length of each digit segment; FIGS. 5A-5D) is only performed once, before the hand pose detection for robot teaching.

The 2D camera image analysis steps to determine hand size (FIGS. 5A-5D) and to determine hand pose from the 3D coordinates of hand key points (FIGS. 6A and 6B) may be performed on a robot controller such as the controller 320 of FIG. 3, or a separate computer in communication with the controller 320.

Figure 7:
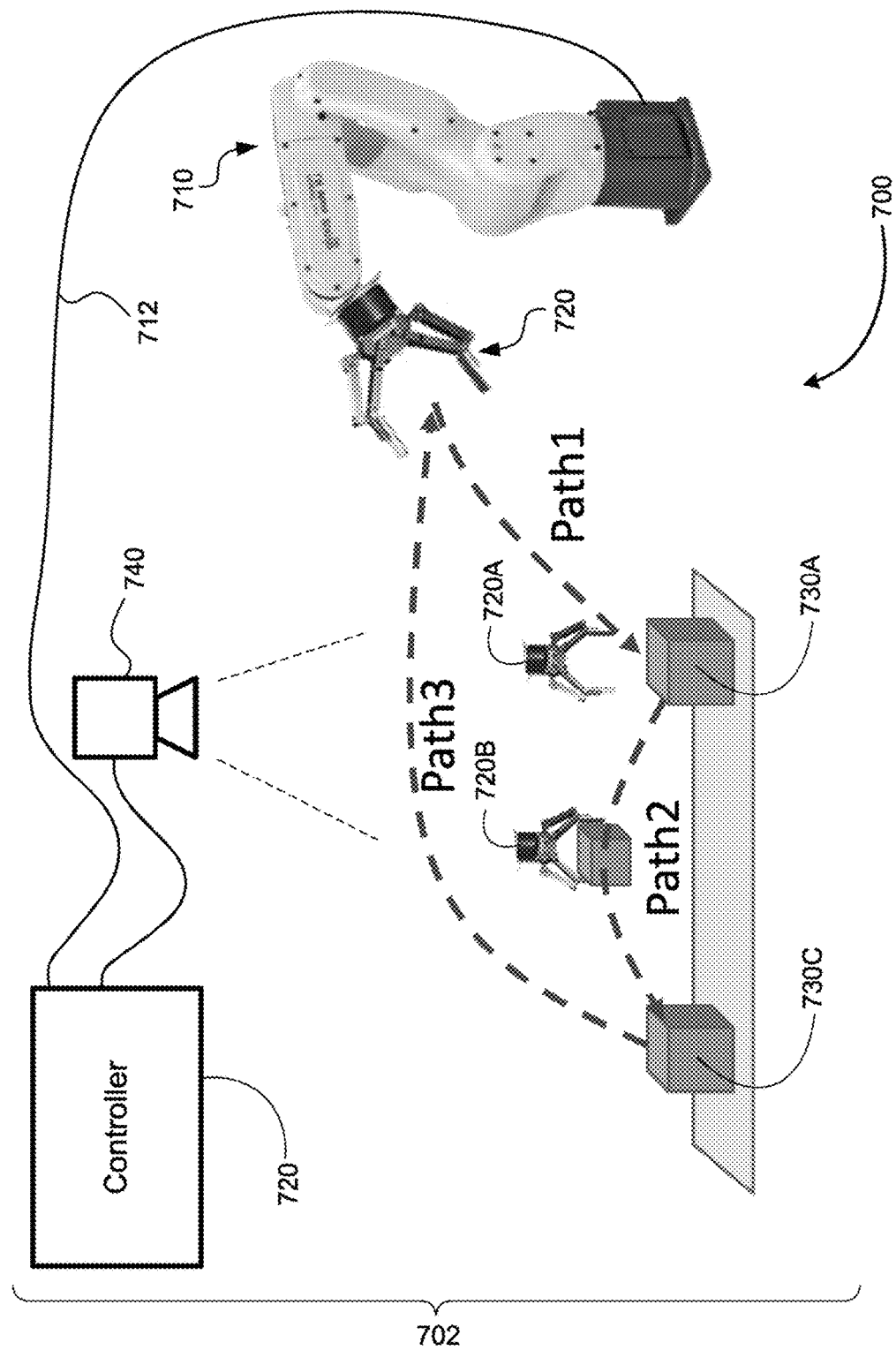
FIG. 7 is an illustration of a system and steps for a robot to perform a pick and place operation using camera images of a workpiece and programming previously taught by human hand images, according to an embodiment of the present disclosure.

FIG. 7 is an illustration of a system 700 and steps for a robot to perform a pick and place operation using camera images of a workpiece and programming previously taught by human hand images, according to an embodiment of the present disclosure. The system 700 is located in a work cell 702, including a camera 740 communicating with a controller 720. These items may or may not be the same as the work cell 302, the camera 310 and the controller 320 shown previously in FIG. 3. In addition to the camera 740 and the controller 720, the work cell 702 includes a robot 710 in communication with the controller 720, typically via a physical cable 712.

The system 700 is designed to "replay" the pick, move and place operations taught by the human operator in the system 300. The hand and workpiece data recorded in the pick, move and place steps of the flowchart diagram 400 are used to generate robot programming instructions as follows. The robot 710 positions a gripper 720 in a Home position, as known by those skilled in the art. The camera 740 identifies a position and orientation of a new workpiece 730, which may be riding on an inbound conveyor. From the box 408 of the Pick step, the controller 320 (FIG. 3) knows the position and orientation of the hand 340 (and thus, from FIG. 1, the position and orientation of the gripper 720) relative to the workpiece 730 to properly grasp the workpiece 730. Path1 is computed as a path to move the gripper 720 from the Home position to the Pick position which has been computed based on the position and orientation of the workpiece 730. The Pick operation takes place at the end of Path1. The gripper 720A is shown along the Path1 nearing the Pick location, and the workpiece 730A is shown at the Pick location.

From the box 440 of the Move step (FIG. 4), the controller 320 knows the position of the workpiece 330 (and thus the workpiece 730) in multiple locations along the Move. Path2 is computed as a path to move the gripper 720A and the workpiece 730A from the Pick position along the Move path. In FIG. 7, one of the intermediate positions along the Move path shows the gripper 720B.

Path2 ends at the Place position recorded at the box 468. This includes both a position and pose (orientation) of the workpiece 330, corresponding to the workpiece 730C. After the gripper 720 places the workpiece 730C in the Place location and orientation, the gripper 720 releases the workpiece 730C and returns to the home position via Path3.

Figure 8:
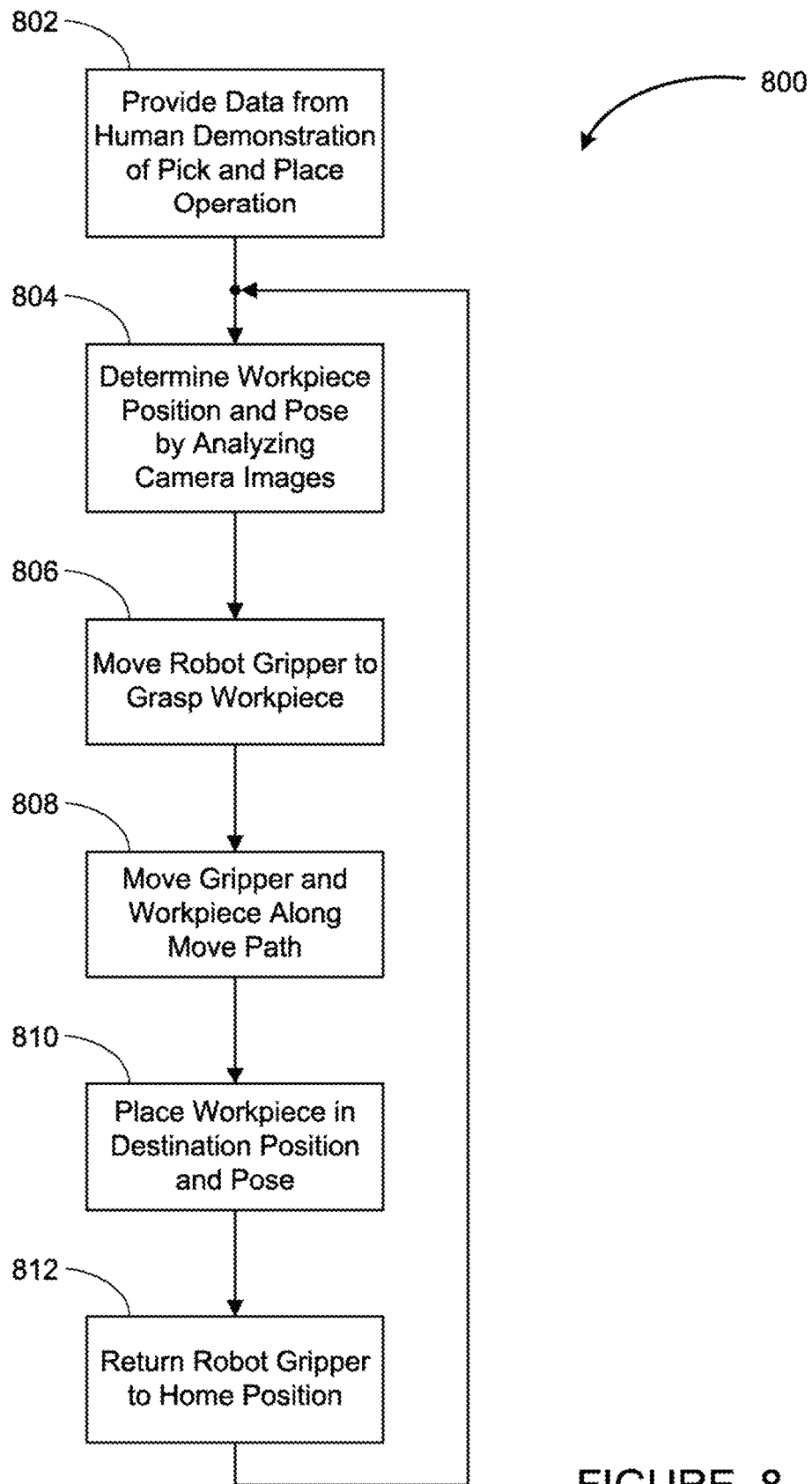
FIG. 8 is a flowchart diagram of a method for a robot to perform a pick and place operation using camera images of a workpiece and programming previously taught by human hand images, according to an embodiment of the present disclosure.

FIG. 8 is a flowchart diagram 800 of a method for a robot to perform a pick and place operation using camera images of a workpiece and programming previously taught by human hand images, according to an embodiment of the present disclosure. At box 802, data from a human demonstration of a pick and place operation is provided to the robot controller 720, as discussed in detail above. This data could come from a 2D or 3D camera, and includes the Pick, Move and Place motion commands taught by the human hand. At box 804, images from the camera 740 are analyzed by the controller 720 to identify a location and orientation (position and pose) of the workpiece 730. At box 806, the controller 720 provides motion commands to the robot 710 to move the gripper 720 from a robot home position to grasp the workpiece 730. The motion commands are computed by the controller 720 based on the position and pose of the workpiece 730 known from analysis of the camera images at the box 806, and the relative position and pose of the gripper 720 with respect to the workpiece 730 known from the human demonstration of the pick operation (FIGS. 3 and 4).

At box 808, the robot 710, in response to controller instructions, moves the gripper 720 holding the workpiece 730 along a move path as taught during the human demonstration. The move path may include one or more intermediate points between the pick location and the place location, so that the move path may trace any three-dimensional curve. At box 810, the robot 710 places the workpiece 730 in the position and pose taught during the human demonstration of the place operation. The workpiece placement position and pose are known from the human demonstration of the place operation, and the relative position and pose of the gripper 720 with respect to the workpiece 730 are known from the human demonstration of the pick operation. At box 812, the robot 710 returns to the robot home position in preparation for receiving instructions to pick a next workpiece.

Following is a summary of the disclosed techniques for robot programming by human demonstration which have been described in detail above:

- A human hand is used to demonstrate grasping, moving and placing a workpiece
- Camera images of the hand and the workpiece are analyzed to determine the proper pose and position of a robot gripper relative to the workpiece, based on key points on the hand
  - Key points on the hand may be determined from images from a 3D camera, or from images from a 2D camera with a preparatory step of hand size determination
- The proper pose and position of the robot gripper relative to the workpiece are used to generate robot motion commands based on camera images of a new workpiece in a replay phase
  - This includes initially grasping the new workpiece, then moving and placing the new workpiece based on the move and place data captured during human demonstration The preceding discussion describes an embodiment of robot teaching by human demonstration where a teaching phase is performed in advance, and a human is no longer in the loop during a replay phase where the robot performs the operation in a real production environment using camera images of inbound workpieces. The pick and place operation described above is just one example of robot teaching by human demonstration; other robotic operations may be taught in the same manner, where camera images of the hand are used to determine a relative position of a gripper or other tool to a workpiece. Another embodiment is disclosed below—where a human remains in the loop during production operations, but camera images of the inbound workpieces are not needed.

Figure 9:
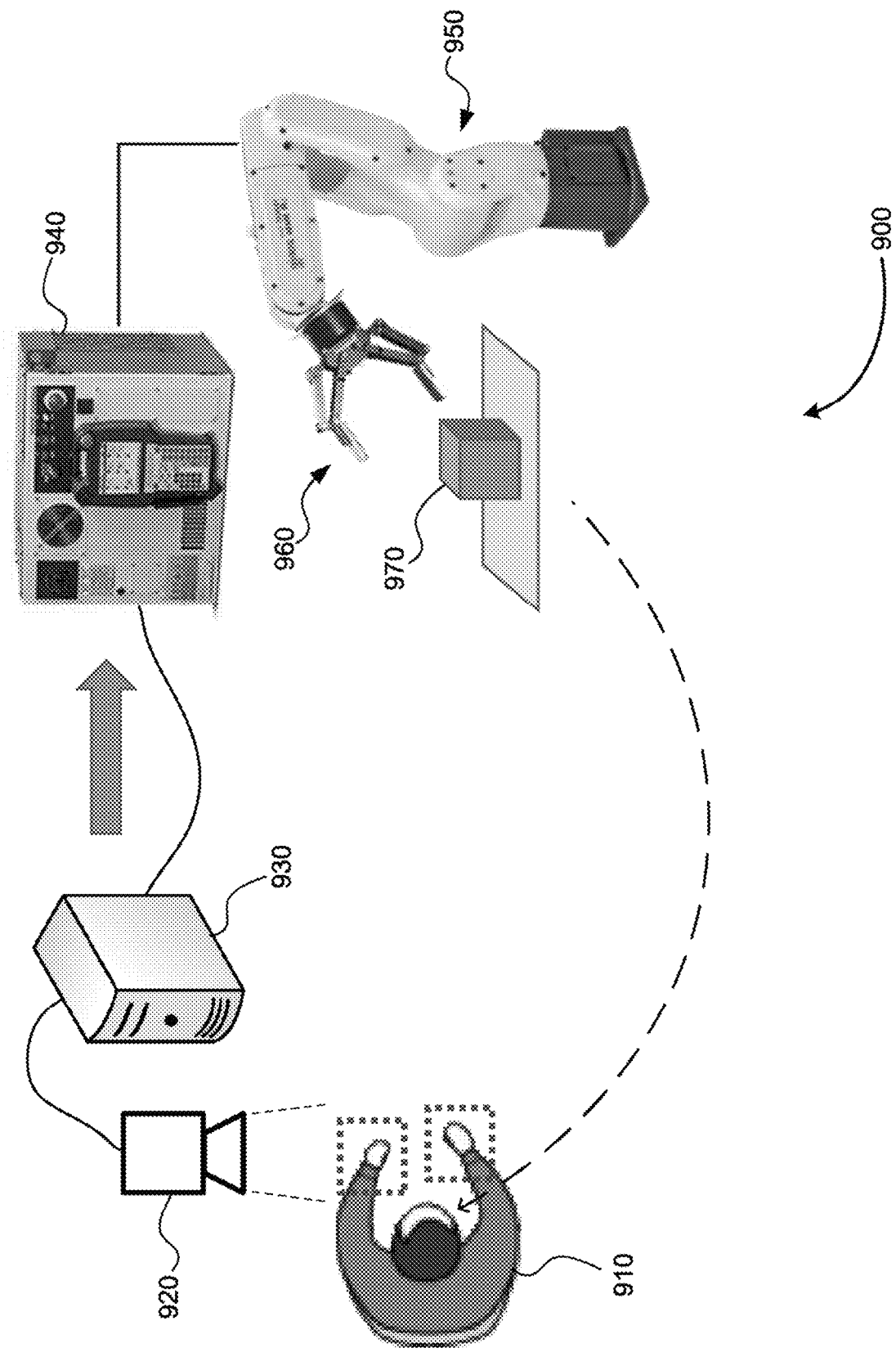
FIG. 9 is an illustration of a system and steps for teleoperation of a robot using camera images of a human hand and visual feedback via the human's eyes, according to an embodiment of the present disclosure.

FIG. 9 is an illustration of a system 900 and steps for teleoperation of a robot using camera images of a human hand and visual feedback via the human's eyes, according to an embodiment of the present disclosure. A human operator 910 is in a position where a camera 920 can capture images of the operator's hands. The camera 920 may be a 2D or 3D camera. The camera 920 provides the images to a computer 930 which analyzes the images to identify key features of the hands, as described in detail in reference to FIGS. 1 and 2, and also FIGS. 5 and 6 (for a 2D camera embodiment). From the analysis of the images, a position and orientation of a hand coordinate frame and hence a gripper coordinate frame can be determined. The position and orientation of the gripper coordinate frame are provided to a robot controller 940. In a slight variation of this embodiment, the computer 930 may be eliminated and the controller 940 may perform the image analysis functions to determine the position and orientation of the gripper coordinate frame.

The controller 940 is in communication with a robot 950. The controller 940 computes robot motion commands to cause the robot 950 to move its gripper 960 to the position and orientation of the gripper coordinate frame identified from the images. The robot 950 moves the gripper 960 in response to the commands from the controller 940, which in turn is responding to the position of the hands from the camera images. A transposition may optionally be included between the hand pose and the gripper pose—such as causing the gripper pose and movement to be a mirror image of the hand pose and movement. The scenario of FIG. 9 is that the gripper 960 is to grasp a workpiece 970 and perform some operation with the workpiece 970—such as moving the workpiece 970 to a different position and/or pose. The gripper 960 is shown as a finger-type gripper, but may instead be a suction cup or magnetic surface gripper as described earlier.

The human operator 910 is in a position where he or she can see the robot 950, the gripper 960 and the workpiece 970. The operator 910 may be in the same work cell with the robot 950, or may be in a separate room separated by a wall with a window. The operator 910 may even be remote from or otherwise visually blocked from the robot 950, in which case a real-time video feed of the robot 950, the gripper 960 and the workpiece 970 would be provided to the operator 910 as a means of visual feedback.

In the system 900, no camera is used to provide images of the workpiece 970. Instead, the operator 910 watches the movements of the gripper 960 and moves his or her hand in order to cause the gripper 960 to perform the operation on the workpiece 970. In one likely scenario, the operator 910 moves his/her hand, with forefinger and thumb spread wide, toward the workpiece 970, continues to move the hand to cause the gripper 960 to approach the workpiece 970 from a desired direction, pinches the forefinger and thumb of his/her hand together to grasp the workpiece 970, and then moves the workpiece 970 to a different position and/or pose while holding the workpiece 970.

In the system 700, the operator 910 moves the hand based on visual feedback of the gripper/workpiece scene, the camera 920 provides continuous images of the hand, and the controller 940 moves the gripper 960 based on movements of the hand as analyzed in the camera images.

Figure 10:
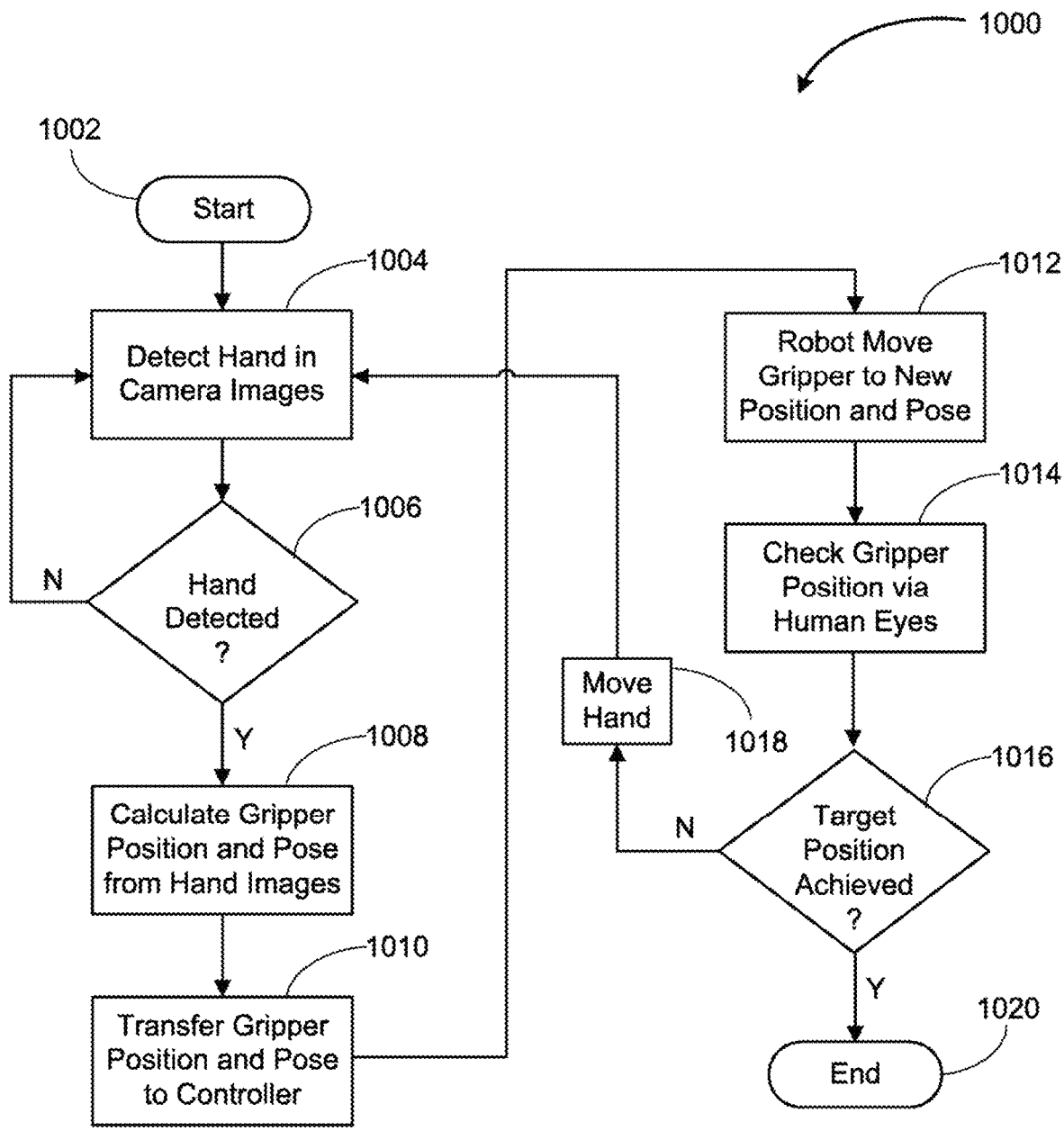
FIG. 10 is a flowchart diagram of a method for teleoperation of a robot using camera images of a human hand and visual feedback via the human's eyes, according to an embodiment of the present disclosure.

FIG. 10 is a flowchart diagram 1000 of a method for teleoperation of a robot using camera images of a human hand and visual feedback via the human's eyes, according to an embodiment of the present disclosure. The method of FIG. 10 uses the system 900 of FIG. 9. The method begins at a start box 1002. At box 1004, the human's hand is detected in the camera images. At decision diamond 1006, if the hand is not detected, the process loops back to the box 1004 to continue taking images. At box 1008, when the hand is properly detected in the camera images, the computer 930 calculates a position and pose of the gripper 960 based on the hand position and pose as determined by identification of key points on the hand.

At box 1010, the gripper position and pose are transferred to the controller 940 from the computer 930. Alternately, the image analysis and calculation of the gripper position and pose may be performed directly on the controller 940, in which case the box 1010 is eliminated. At box 1012, the controller 940 provides motion commands to the robot 950 to move the gripper 960 to the new position and pose based on the most recently analyzed image of the hand. At box 1014, the human operator 910 visually checks the gripper position and pose. At decision diamond 1016, the operator 910 determines if the target position of the gripper 960 has been achieved. If not, the operator 910 moves the hand at box 1018, causing the gripper 960 to make a corresponding move via closed-loop feedback to new camera images. When the target position is achieved, the process ends at terminus 1020.

In actual practice, the operator 910 may make a continuous sequence of hand motions to control the robot via teleoperation. For example, the operator 910 may move his/her hand to cause the gripper 960 to approach the workpiece 970, grasp the workpiece 970, move the workpiece 970 to a destination location, place and release the workpiece 970, and move the gripper 960 back to the starting location to approach a new workpiece.

Throughout the preceding discussion, various computers and controllers are described and implied. It is to be understood that the software applications and modules of these computer and controllers are executed on one or more computing devices having a processor and a memory module. In particular, this includes the processors in the robot controllers 320, 720 and 940 discussed above, along with the computer 930. Specifically, the processors in the controllers 320, 720 and 940 and the computer 930 are configured to perform the robot teaching via human demonstration in the manner discussed above.

As outlined above, the disclosed techniques for robot teaching by human demonstration make robot motion programming faster, easier and more intuitive than previous techniques, while providing the simplicity of requiring only a single camera.

While a number of exemplary aspects and embodiments of robot teaching by human demonstration have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for programming a robot to perform an operation by human demonstration, said method comprising:

demonstrating the operation on a workpiece by a human hand;

analyzing camera images of the hand demonstrating the operation on the workpiece, by a computer receiving the images from a two dimensional camera, to create demonstration data, where the demonstration data defines a pick, move and place operation including a grasping step where hand pose and workpiece pose are determined when the hand grasps the workpiece, a move step where hand pose and workpiece pose are determined at a plurality of points defining a move path, and a place step where the workpiece pose is determined when the workpiece becomes stationary after the move step, where the demonstration data includes a hand coordinate frame and a gripper coordinate frame corresponding to the hand coordinate frame, where the gripper coordinate frame represents a gripper type selected from a group including a finger-type gripper and a vacuum-type gripper, and where the hand coordinate frame is computed from the camera images by processing the camera images in a neural network convolution layer to identify key points on the human hand in the camera images, performing a Point-n-Perspective calculation using the key points on the human hand in the camera images and previously determined true lengths of a plurality of segments of digits of the human hand, and calculating a three-dimensional pose of the plurality of segments, and the true lengths of the plurality of segments of the digits of the human hand were previously determined using a hand size image analysis step including providing a sizing image of the human hand on a fiducial marker grid, analyzing the sizing image to compute transformations from a marker coordinate system to a screen coordinate system, processing the sizing image in a neural network convolution layer to identify key points on the human hand in the sizing image, using the transformations to compute coordinates of the key points in the marker coordinate system, and calculating the true lengths of the segments of the digits of the human hand;

analyzing camera images of a new workpiece to determine an initial position and orientation of the new workpiece;

generating robot motion commands, based on the demonstration data and the initial position and orientation of the new workpiece, to cause the robot to perform the operation on the new workpiece; and performing the operation on the new workpiece by the robot.

2. The method according to claim 1 wherein demonstrating the operation on the workpiece by the human hand and performing the operation on the new workpiece by the robot are both performed in a robotic work cell.

3. The method according to claim 1 wherein analyzing camera images of the hand demonstrating the operation includes identifying locations of a plurality of points on the hand, including a tip, a base knuckle and a second knuckle of each of a thumb and a forefinger.

4. The method according to claim 3 wherein the demonstration data includes, at the grasping step of the operation, position and orientation of the hand coordinate frame, the gripper coordinate frame corresponding to the hand coordinate frame, and a workpiece coordinate frame.

5. The method according to claim 4 wherein the demonstration data further includes positions of the hand coordinate frame and the workpiece coordinate frame for the plurality of points in the move step of the operation, and position and orientation of the workpiece coordinate frame for the place step of the operation.

6. The method according to claim 4 wherein the hand coordinate frame has an origin at a point midway between the base knuckles of the thumb and forefinger, a Z axis passing through a point midway between the tips of the thumb and forefinger, and a Y axis normal to a plane containing the thumb and forefinger.

7. The method according to claim 1 wherein the new workpiece, before the operation by the robot, rides on a conveyor, and the initial position of the new workpiece is a function of a conveyor position index.

8. The method according to claim 1 wherein generating robot motion commands includes generating commands, by a robot controller having a processor and memory, to cause a robot gripper to move to a grasping position and orientation based on the initial position and orientation of the new workpiece and position and orientation of the gripper relative to the workpiece contained in the demonstration data.

9. The method according to claim 8 wherein generating robot motion commands further includes generating commands causing the robot gripper to move the new workpiece from the grasping position to other positions contained in the demonstration data.

10. The method according to claim 8 wherein the robot gripper is a finger-type gripper or a surface gripper using suction or magnetic force.

11. A method for programming a robot to perform an operation by human demonstration, said method comprising:

demonstrating the operation on a workpiece by a human hand;

analyzing camera images of the hand demonstrating the operation on the workpiece to create demonstration data, including analyzing image pixel data of the hand, from a two-dimensional (2D) camera, to identify tip, base knuckle and second knuckle points on a thumb and forefinger of the hand and compute a hand coordinate frame and a corresponding gripper coordinate frame, where the gripper coordinate frame represents a gripper type selected from a group including a finger-type gripper and a vacuum-type gripper, and determining a position and orientation of the gripper coordinate frame relative to the workpiece, where the hand coordinate frame is computed from the camera images by processing the camera images in a neural network convolution layer to identify key points on the human hand in the camera images, performing a Point-n-Perspective calculation using the key points on the human hand in the camera images and previously determined true lengths of a plurality of segments of digits of the human hand, and calculating a three-dimensional pose of the plurality of segments, and the true lengths of the plurality of segments of the digits of the human hand were previously determined using a hand size image analysis step including providing a sizing image of the human hand on a fiducial marker grid, analyzing the sizing image to compute transformations from a marker coordinate system to a screen coordinate system, processing the sizing image in a neural network convolution layer to identify key points on the human hand in the sizing image, using the transformations to compute coordinates of the key points in the marker coordinate system, and calculating the true lengths of the segments of the digits of the human hand;

analyzing camera images of a new workpiece to determine an initial position and orientation of the new workpiece, including adjusting the initial position and orientation of the new workpiece based on a conveyor position index;

generating robot motion commands, by a robot controller having a processor and memory, based on the demonstration data and the initial position and orientation of the new workpiece, to cause the robot to perform the operation on the new workpiece, including motion commands causing the gripper to move to a grasping position and orientation based on the initial position and orientation of the new workpiece and the position and orientation of the gripper relative to the workpiece contained in the demonstration data; and performing the operation on the new workpiece by the robot.

12. The method according to claim 11 wherein demonstrating the operation on the workpiece by the human hand and performing the operation on the new workpiece by the robot are both performed in a robotic work cell, and the 2D camera provides the camera images of the hand demonstrating the operation on the workpiece and the camera images of the new workpiece.

13. A system for programming a robot to perform an operation by human demonstration, said system comprising:

a two-dimensional (2D) camera;

an industrial robot; and a robot controller having a processor and memory, said controller being in communication with the robot and receiving images from the 2D camera, said controller being configured to perform steps including:

analyzing camera images of a human hand demonstrating the operation on the workpiece to create demonstration data, where the demonstration data defines a pick, move and place operation including a grasping step where hand pose and workpiece pose are determined when the hand grasps the workpiece, a move step where hand pose and workpiece pose are determined at a plurality of points defining a move path, and a place step where the workpiece pose is determined when the workpiece becomes stationary after the move step, where the demonstration data includes a hand coordinate frame and a gripper coordinate frame corresponding to the hand coordinate frame, where the gripper coordinate frame represents a gripper type selected from a group including a finger-type gripper and a vacuum-type gripper, and where the hand coordinate frame is computed from the camera images by processing the camera images in a neural network convolution layer to identify key points on the human hand in the camera images, performing a Point-n-Perspective calculation using the key points on the human hand in the camera images and previously determined true lengths of a plurality of segments of digits of the human hand, and calculating a three-dimensional pose of the plurality of segments, and the true lengths of the plurality of segments of the digits of the human hand were previously determined using a hand size image analysis step including providing a sizing image of the human hand on a fiducial marker grid, analyzing the sizing image to compute transformations from a marker coordinate system to a screen coordinate system, processing the sizing image in a neural network convolution layer to identify key points on the human hand in the sizing image, using the transformations to compute coordinates of the key points in the marker coordinate system, and calculating the true lengths of the segments of the digits of the human hand;

analyzing camera images of a new workpiece to determine an initial position and orientation of the new workpiece;

generating robot motion commands, based on the demonstration data and the initial position and orientation of the new workpiece, to cause the robot to perform the operation on the new workpiece; and performing the operation on the new workpiece by the robot.

14. The system according to claim 13 wherein analyzing camera images of the hand demonstrating the operation includes identifying locations of a plurality of key points on the hand, including a tip, a base knuckle and a second knuckle of each of a thumb and a forefinger.

15. The system according to claim 14 wherein the demonstration data includes, at the grasping step of the operation, position and orientation of the hand coordinate frame, the gripper coordinate frame corresponding to the hand coordinate frame, and a workpiece coordinate frame.

16. The system according to claim 15 wherein the demonstration data further includes positions of the hand coordinate frame and the workpiece coordinate frame for the plurality of points in the move step of the operation, and position and orientation of the workpiece coordinate frame for the place step of the operation.

17. The system according to claim 15 wherein the hand coordinate frame has an origin at a point midway between the base knuckles of the thumb and forefinger, a Z axis passing through a point midway between the tips of the thumb and forefinger, and a Y axis normal to a plane containing the thumb and forefinger.

18. The system according to claim 13 further comprising a conveyor, where the new workpiece, before the operation by the robot, rides on the conveyor, and the initial position of the new workpiece is a function of a conveyor position index.

19. The system according to claim 13 wherein generating robot motion commands includes generating commands to cause a robot gripper to move to a grasping position and orientation based on the initial position and orientation of the new workpiece and position and orientation of the gripper relative to the workpiece contained in the demonstration data, and generating commands to cause the robot gripper to move the new workpiece from the grasping position to other positions contained in the demonstration data.

20. The system according to claim 13 wherein the robot gripper is a finger-type gripper or a surface gripper using suction or magnetic force.

* * * * *